United States Patent
Leonard

(10) Patent No.: US 8,261,061 B2
(45) Date of Patent: Sep. 4, 2012

(54) METHODS AND SYSTEMS FOR ENCOURAGING SECURE COMMUNICATIONS

(75) Inventor: Sean Joseph Leonard, Sacramento, CA (US)

(73) Assignee: Penango, Inc., Sacramento, CA (US)

( * ) Notice: Subject to any disclaimer, the term of this patent is extended or adjusted under 35 U.S.C. 154(b) by 884 days.

(21) Appl. No.: 12/252,335

(22) Filed: Oct. 15, 2008

(65) Prior Publication Data

US 2009/0100263 A1 Apr. 16, 2009

Related U.S. Application Data

(60) Provisional application No. 60/980,018, filed on Oct. 15, 2007.

(51) Int. Cl.
*H04L 29/06* (2006.01)
*H04L 9/08* (2006.01)

(52) U.S. Cl. ........ 713/155; 713/170; 713/173; 713/175; 380/277; 380/284; 380/285

(58) Field of Classification Search ........... 713/155, 713/170, 173, 175; 380/277, 284, 285
See application file for complete search history.

(56) References Cited

U.S. PATENT DOCUMENTS

| | | | | |
|---|---|---|---|---|
| 5,872,849 A * | 2/1999 | Sudia | | 713/175 |
| 6,009,177 A * | 12/1999 | Sudia | | 713/191 |
| 6,202,150 B1 * | 3/2001 | Young et al. | | 713/167 |
| 6,389,136 B1 * | 5/2002 | Young et al. | | 380/28 |
| 6,463,534 B1 * | 10/2002 | Geiger et al. | | 713/168 |
| 7,243,238 B2 * | 7/2007 | Watanabe et al. | | 713/182 |
| 2001/0050990 A1 * | 12/2001 | Sudia | | 380/286 |
| 2001/0055396 A1 | 12/2001 | Jevans | | |
| 2002/0049681 A1 * | 4/2002 | Herreweghen | | 705/64 |
| 2002/0069361 A1 * | 6/2002 | Watanabe et al. | | 713/185 |
| 2002/0162003 A1 * | 10/2002 | Ahmed | | 713/176 |
| 2003/0028495 A1 | 2/2003 | Pallante | | |
| 2003/0076961 A1 | 4/2003 | Kim et al. | | |
| 2003/0172122 A1 | 9/2003 | Little et al. | | |
| 2004/0109568 A1 * | 6/2004 | Slick et al. | | 380/277 |
| 2005/0054334 A1 | 3/2005 | Brown et al. | | |
| 2006/0293035 A1 | 12/2006 | Brown et al. | | |
| 2007/0022162 A1 * | 1/2007 | Thayer et al. | | 709/206 |
| 2007/0022295 A1 * | 1/2007 | Little et al. | | 713/176 |

(Continued)

FOREIGN PATENT DOCUMENTS

EP 1 164 745 A2 12/2001

(Continued)

OTHER PUBLICATIONS

PCT International Search Report and Written Opinion, Application No. PCT/US2008/080049, Application Date Oct. 15, 2008, 19 pages.

(Continued)

*Primary Examiner* — Krisna Lim
(74) *Attorney, Agent, or Firm* — Knobbe, Martens, Olson & Bear, LLP

(57) ABSTRACT

Embodiments of the present invention enable a user to engage in secure communications using digital certificates and other cryptographic technologies in an easy way with a minimum of distracting interaction. In some embodiments of the present invention, webmail is enabled to allow users to obtain and use S/MIME certificates to secure his or her e-mails. Embodiments of the present invention can also be implemented to other forms of messaging, such as text messages, instant messages, etc.

9 Claims, 6 Drawing Sheets

U.S. PATENT DOCUMENTS

| | | | |
|---|---|---|---|
| 2007/0143596 A1* | 6/2007 | Myers et al. | 713/156 |
| 2007/0220614 A1* | 9/2007 | Ellis et al. | 726/27 |
| 2008/0222425 A1 | 9/2008 | Buss | |
| 2009/0100263 A1 | 4/2009 | Leonard | |
| 2009/0106557 A1 | 4/2009 | Leonard | |
| 2009/0113328 A1 | 4/2009 | Leonard | |
| 2010/0121928 A1 | 5/2010 | Leonard | |

FOREIGN PATENT DOCUMENTS

| | | |
|---|---|---|
| EP | 1164745 A2 | 12/2001 |
| EP | 2 201 737 | 6/2010 |
| EP | 2 204 033 | 7/2010 |
| KR | 2003-0032423 A | 4/2003 |
| KR | 3032423 A | 4/2003 |
| WO | WO 2009/052217 | 4/2009 |
| WO | WO 2009/052524 | 4/2009 |
| WO | WO 2010/053999 | 5/2010 |

OTHER PUBLICATIONS

PCT International Preliminary Report on Patentability, Application No. Application No. PCT/US2008/080556, Application Date Oct. 20, 2008. 9 pages.

PCT International Search Report and Written Opinion, Application No. PCT/US2008/080556, Application Date Oct. 20, 2008. 15 pages.

PCT International Search Report and Written Opinion, Application No. PCT/US2009/063291, Application Date Nov. 4, 2009. 10 pages.

Ben Adida, et al., Lightweight Email Signatures, Computer Science and Artificial Intelligence Laboratory, Massachusetts Institute of Technology; Cambridge, MA, Feb. 1, 2006, pp. 1-20.

Garfunkel, et al., "How to Make Secure Mail Easier to Use" CHI 2005, Apr. 2-7, 2005, Portland Oregon, USA.

Masone and Smith, "Towards Usefully Secure Email" Department of Computer Science, Dartmouth College, IEEE Technology and Society (Special Issue on Security and Usability), 26 (12): 25-34. Spring 2007.

Peter Gutmann, "Why Isn't the Internet Secure Yet, Dammit?" University of Auckland, presented at the 2004 AusCERT Conference, May 23-27, 2004, pp. 1-41.

Adams, C., et al., Internet X.509 Public Key Infrastructure Time Stamp Protocol (TSP), RFC 3161, Aug. 2001.

Comodo, "Free Secure Email Certificates," <http://www.instantssl.com/ssl-certificate-products/free-email-certificate.html> (retrieved by archive.org on Oct. 11, 2007).

Esposito, Dino, "Browser Helper Objects,"<http://msdn2.microsoft.com/en-s/library/bb250436.aspx> (published Jan. 1999).

Extensions—Mozilla Developer Center, <http://developer.mozilla.org/en/docs/Extensions> (May 30, 2007).

Fu, Anthony Y., et al., "The Methodology and an Application to Fight Against Unicode Attacks," Symposium on Usable Privacy and Security (SOUPS), Jul. 12-14, 2006, Pittsburgh, PA.

Garfinkel, Simson, "Design Principles and Patterns for Computer Systems That Are Simultaneously Secure and Usable," <http://hdl.handle.net/1721.1/33204> (May 2005).

Glick, Jennifer, Mozilla/MachV: Mail: Security: Encryption and Signing, Oct. 3, 2001, http://www-archive.mozilla.org/mailnews/specs/security/.

Goodmail Systems, Senders: How It Works, http://www.goodmailsystems.com/senders/how_it_works.php (retrieved by archive.org on May 17, 2007).

Gutmann, Peter, "PKI Technology Survey and Blueprint," <http://www.cs.auckland.ac.nz/~pgut001/pubs/pkitech.pdf> (Mar. 31, 2003).

Housley, R., Cryptographic Message Syntax (CMS), RFC 3852, Jul. 2004.

Housley, R., Internet X.509 Public Key Infrastructure Certificate and Certificate Revocation List (CRL) Profile, RFC 3280, Apr. 2002.

IBM PCI Cryptographic Coprocessor, described in IBM Cryptographic Products: IBM PCI Cryptographic Coprocessor: General Information Manual, May 2002, 6th ed., IBM Corporation.

Jackson, Collin, et al., "An Evaluation of Extended Validation and Picture-in-Picture Phishing Attacks," Proceedings of Usable Security (USEC'07), Feb. 2007.

Jones, Richard and Sean Leonard, software product entitled "Gmail S/MIME 0.2.4" (Jul. 2007), described in <http://richard.jones.name/google-hacks/gmail-smime/gmail-smime.html>.

Klensin, J., Simple Mail Transfer Protocol, RFC 2821, Apr. 2001.

Krammer, Victor, "Phishing Defense Against IDN Address Spoofing Attacks," Proceedings of the 2006 International Conference on Privacy, Security and Trust, May 2006.

Lieberman, Eric and Robert C. Miller, "Facemail: Showing Faces of Recipients to Prevent Misdirected Email" (retrieved by archive.org on Aug. 24, 2007).

Plaxo Products, <http://www.plaxo.com/products> (retrieved by archive.org on Oct. 11, 2007).

Ramsdell, B., S/MIME Version 3 Message Specification, RFC 2633 (Jun. 1999).

Wu, Min, et al., "Do Security Toolbars Actually Prevent Phishing Attacks?" CHI 2006, Apr. 22-27, 2006, ACM, Montreal, Quebec, Canada.

\* cited by examiner

```
--gmsm0.2.4eqf7saj8hvzwe2kjh9ys2
Content-Type: application/pkcs7-signature; name="Ext Digital Signature.p7s"
Content-Transfer-Encoding: base64
Content-Disposition: attachment; filename="Ext Digital Signature.p7s"
Content-Description: S/MIME Cryptographic Signature MIIJ0QYJKoZIhvcNAQcCoIIJwjCCCb4CAQExCzAJBgUrDgMCGgUAMAsGCSqGSIb3
```

FIG. 5

Mail | Personal Calendar | Administrative Calendar | Events | Directory Search

Check Mail | Inbox | Compose | Folders | Search | Address Book | Preferences | Options | Purge Deleted | FAQ |

Delete  Prev  Next  Reply/All  Forward/Inline  Open  Inbox  7304 of 7305  [ Go to ] [    ] [ Move ] [ Copy ]

Date: Sun, 14 Oct 2007 20:11:18 -0500
From:                                             Add To Address Book
Subject: Here is a Subject
To:

Dear Bob,

I enjoy cheese sandwiches.

Your Friend,

Alice
Ask me about Ext. Let's make e-mail safer and more reliable for everyone!

Attachment: Ext Digital Signature.p7s (4k bytes) Open

Delete  Prev  Next  Reply/All  Forward/Inline  Open  Inbox  7304 of 7305  [ Go to ] [    ] [ Move ] [ Copy ]

Mail | Personal Calendar | Administrative Calendar | Events | Directory Search

Check Mail | Inbox | Compose | Folders | Search | Address Book | Preferences | Options | Purge Deleted | FAQ |

Delete  Prev  Next  Reply/All  Forward/Inline  Open  Inbox  7304 of 7305  [ Go to ] [    ] [ Move ] [ Copy ]

Date: Sun, 14 Oct 2007 20:18:54 -0500
From:                                             Add To Address Book
Subject: Better Encouragement
To:

Dear Bob,

I truly love cheese sandwiches. Let's go to a restaurant that serves cheese sandwiches sometime.

Your Friend,

Alice
Ask me about Ext. Let's make e-mail safer and more reliable for everyone!

Attachment: Get Ext and Trust Your Mail Again (4k bytes) Open

Delete  Prev  Next  Reply/All  Forward/Inline  Open  Inbox  7304 of 7305  [ Go to ] [    ] [ Move ] [ Copy ]

FIG. 6

METHODS AND SYSTEMS FOR ENCOURAGING SECURE COMMUNICATIONS

CROSS-REFERENCE TO RELATED APPLICATIONS

This application claims priority to U.S. Provisional Patent Application No. 60/980,018 filed on Oct. 15, 2007, entitled "Methods for Encouraging Secure Communications," by Sean J. Leonard, which is incorporated herein by reference in its entirety.

BACKGROUND

1. Field

This invention relates to electronic communications and messaging systems. In particular, embodiments of the present invention relate to secure messaging systems, such as encrypted and authenticated messaging systems, and procedures for encouraging the use of secure messaging.

2. Description of the Related Art

Today, networks like the Internet and mobile networks allow for wide access to communications and messaging, such as e-mail, text messages, instant messages, and the like. Surprisingly, however, most of this communications and messaging traffic is not secured or protected. For example, the overwhelming majority of e-mail messages are sent unencrypted and unsigned, so that any eavesdropper on a communications session over the Internet can read and alter such e-mail while in transit or in storage.

Sending and receiving encrypted and signed (e.g., authenticated) messages is a capability well-known in the art. In a typical system, a user may obtain a certificate for free or for a fee from a certificate authority (CA). The CA verifies the user's identity and e-mail address. The user can then navigate to CA's website and completes a series of actions, such as filling out forms, on the website. This typically entails the user entering personal data, including an e-mail address. A public-private key pair is then generated for the user. The user submits a certificate request containing his or her public key along with the rest of the aforementioned information during the course of submitting data to the website. The private key is stored on the user's computer. The CA's website then verifies the user's identity by sending a confirmation, for example, via an e-mail to the user. In the confirmation, a link is included, and when the user manually follows the link, the CA's website causes an issued certificate to be installed into the user's web browser and united with the related private key.

Unfortunately, the use of these security mechanisms is not widespread. For example, despite the existence of well-established CAs and public key infrastructure (PKI), the use of technologies such as S/MIME and PGP is not very widespread. One reason for the lack acceptance is the process of establishing these security mechanisms requires considerable user interaction. For example, the known systems and processes for obtaining a digital certificate and private key will typically entail at least 20 manual steps by the user.

In addition, other obstacles have slowed the acceptance of securing online communications. For example, many e-mail clients and software cannot handle S/MIME messages. Webmail clients are particularly known for not supporting S/MIME. S/MIME is currently considered ill-suited for use via webmail clients by those skilled in the art. One reason is that some security practices require the private key to be kept accessible to the user, but inaccessible from the webmail server. This complicates a key webmail advantage of providing ubiquitous accessibility. This issue with S/MIME and webmail is not unique. Therefore, for these and other reasons, the vast majority of messaging remains relatively unsecured.

SUMMARY

In one embodiment, a method of securing communications comprises: accessing a messaging service; extracting identification information that identifies a user of the service; in response to a single action by the user and without further interaction with the user, obtaining a key pair comprising a public key and a private key, and submitting a request for a certificate to a certificate authority (CA) based on the key pair; receiving a verification code from the CA; confirming receipt of the verification code from said CA; generating a certificate for the user based on the verification code and the key pair; and securing communications from the user based on the generated certificate.

In another embodiment, a method of sending secure communications comprises: composing a message comprising a digital signature, signed data, and encrypted data; labeling the content of the message when the message does not conform to a standard applicable to the message; and displaying the label to indicate how the message does not conform to the standard.

In another embodiment, a method of sending secure communications comprises: inserting a tag line indicating a compliance of message in relation to a standard that is applicable to the message; and sending a message comprising a message body, a digital signature, signed data, and encrypted data, wherein said message is configured to include the tag line at when the message is displayed at the recipient.

In another embodiment, a method of maintaining a repository of preferences related to sending secure messages comprises: storing a set of preferences in a cascade of repositories that are accessible by a set of messaging services used by a user; and synchronizing the preferences among the cascade of repositories.

BRIEF DESCRIPTION OF THE DRAWINGS

FIG. 5 shows an extract of Multipurpose Internet Mail Extensions (MIME) material including MIME headers when varying the filename per certain embodiments of the invention.

FIG. 6 shows samples of messages including taglines and digital signature data displayed using techniques of embodiments of the invention.

DETAILED DESCRIPTION OF EMBODIMENTS

Embodiments of the present invention enable a user to engage in secure communications using digital certificates and other cryptographic technologies in an easy way with a minimum of distracting interaction. For purposes of illustration, embodiments of the present invention are described with reference to securing e-mail messages. In particular, embodiments are disclosed that provide an alternative approach to webmail and enabling users to obtain S/MIME certificates. Of course, webmail is provided as an example and other forms of messaging, such as e-mail via software-based clients, text messages, SMS, instant messages, are within the scope of the present disclosure. One skilled in the art will recognize that embodiments of the present invention can be implemented to any form of messaging, such as text messages, instant messages, etc.

Some embodiments drastically reduce the steps required for user interaction, resulting in a more pleasant user experience and therefore in an increase in the numbers of users who would be willing to use digital certificate technology for his or her messaging. At the same time, embodiments of the prevention invention do not require that anyone other than the user have access to the private key. Reference will now be made in detail to the exemplary embodiments of the invention, which are illustrated in the accompanying drawings. Wherever possible, the same reference numbers will be used throughout the drawings to refer to the same or like parts.

Figure 1:
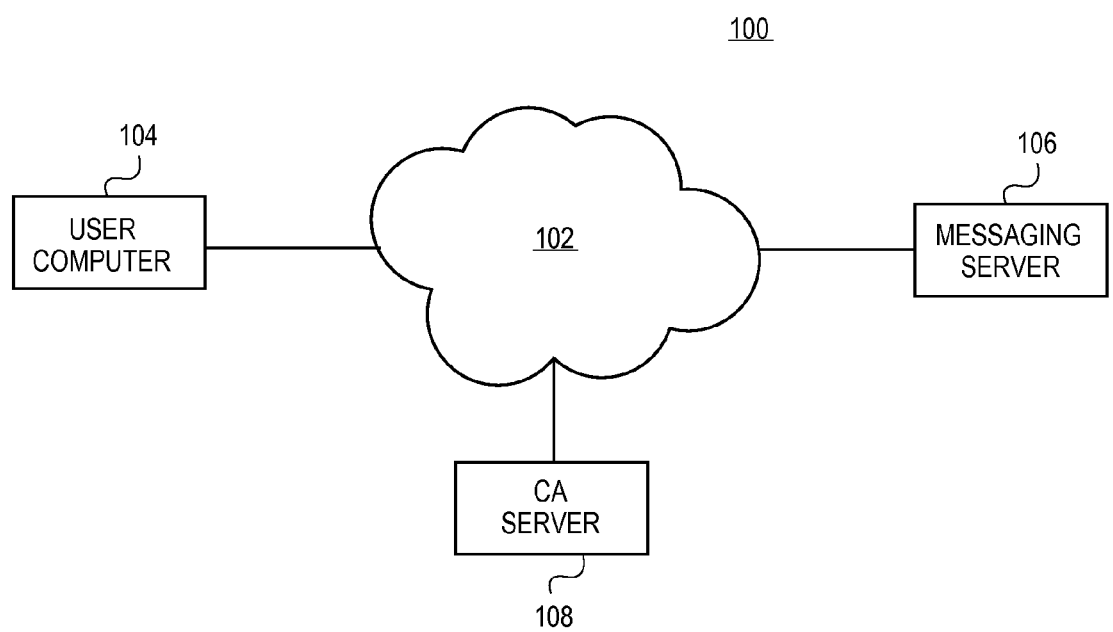
FIG. 1 shows an exemplary system consistent with embodiments of the present invention.
Figure 2:
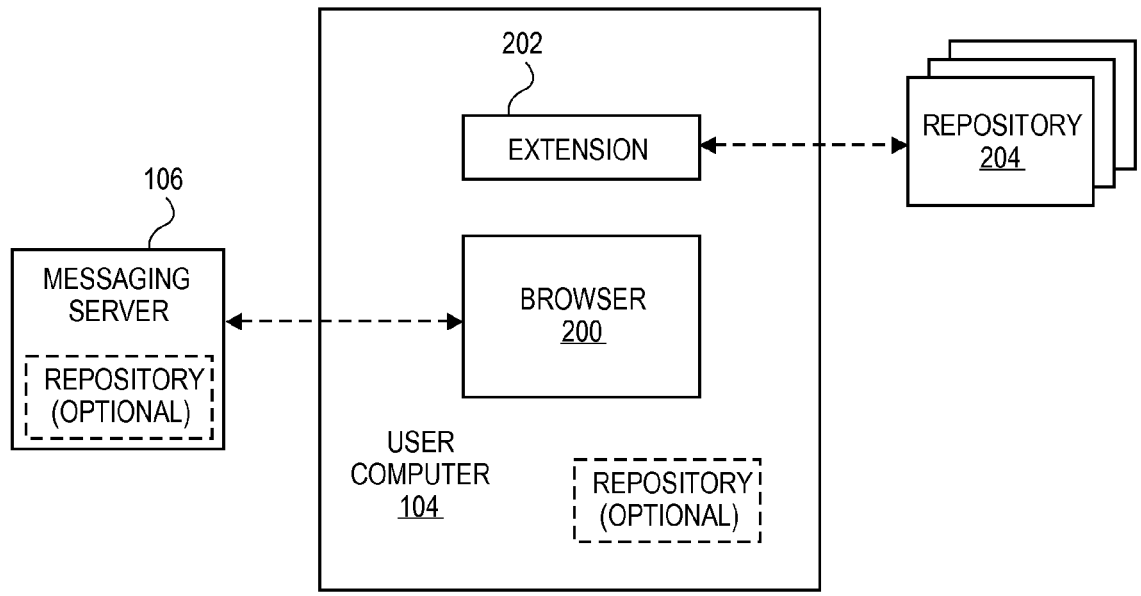
FIG. 2 shows an exemplary browser and extension consistent with some embodiments of the present invention.
Figure 3:
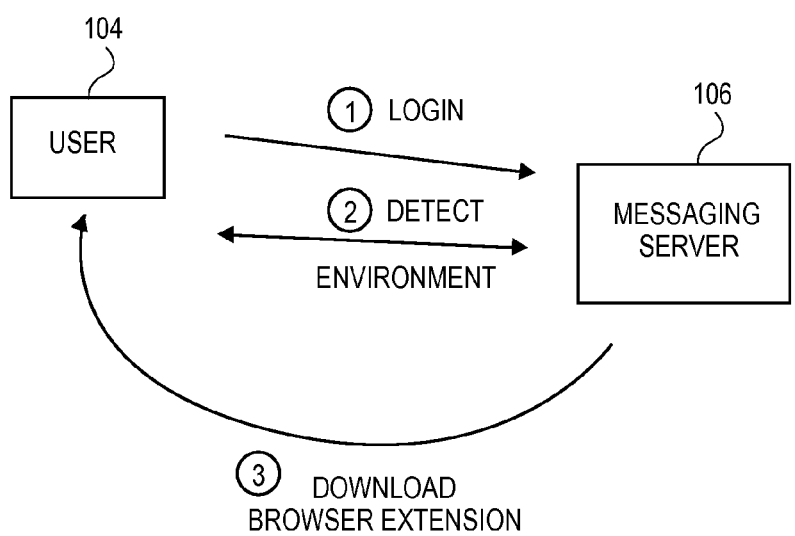
FIG. 3 illustrates an exemplary process flow for configuring a browser in accordance with some embodiments of the present invention.
Figure 4:
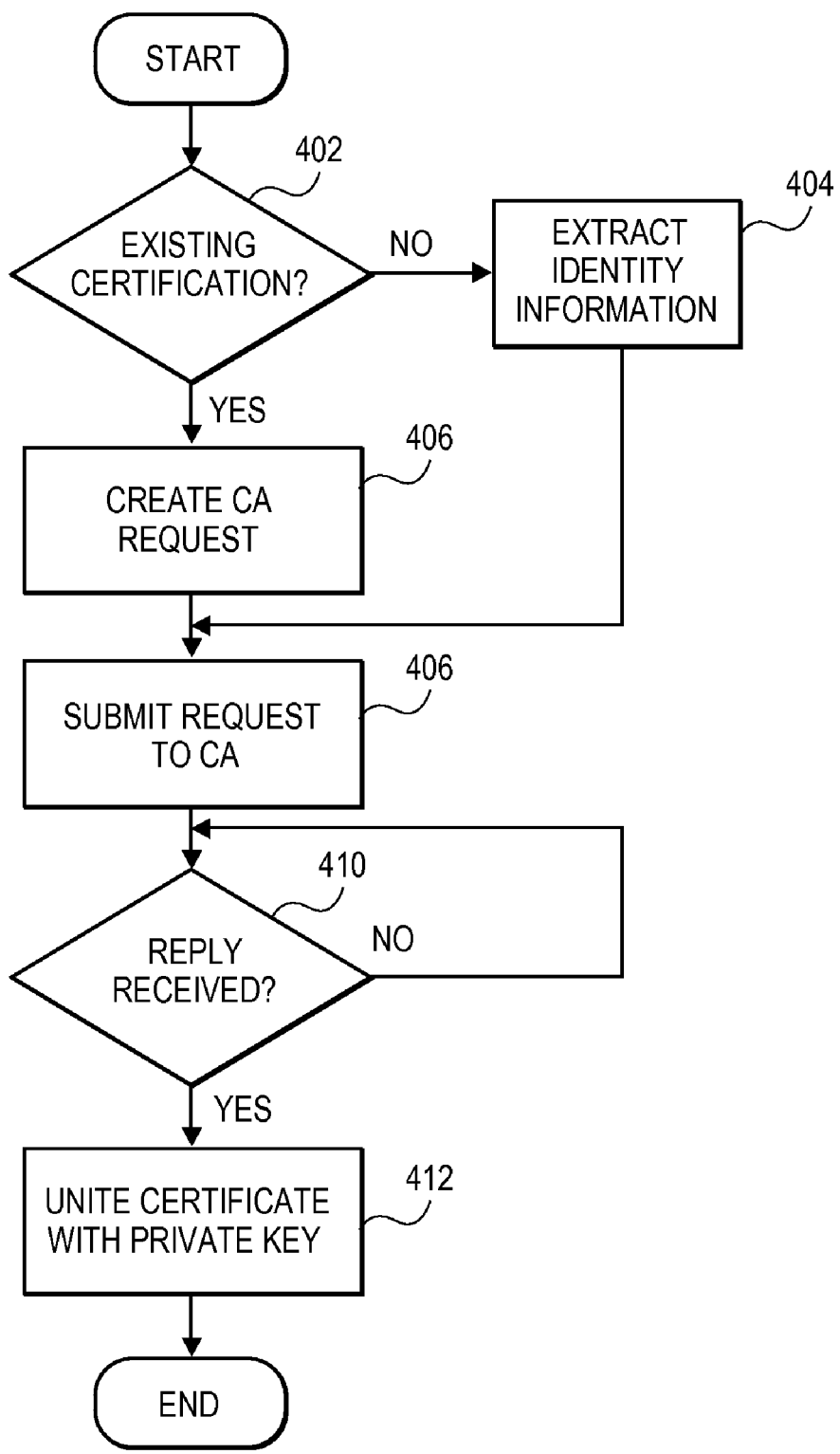
FIG. 4 illustrates an exemplary process flow for obtaining a digital certificate consistent with some embodiments of the present invention.
Figure 7:
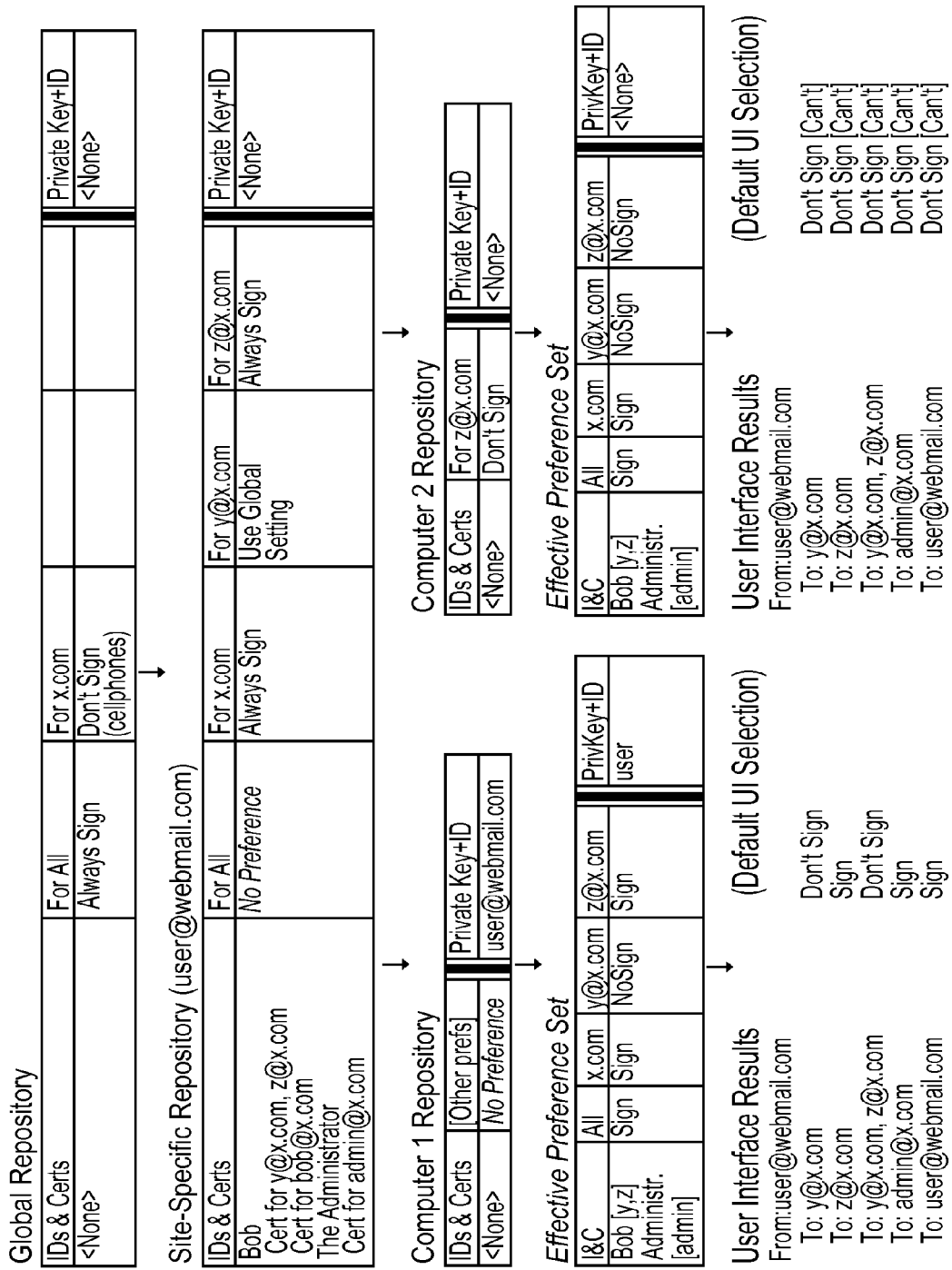
FIG. 7 shows how a cascade of repositories may be chained together to build preference sets, which the extension uses in determining its behavior, such as the default behavior and UI selection for signing messages under composition.

In general, FIG. 1 shows an exemplary system and FIG. 2 shows an exemplary browser and extension. FIGS. 3 and 4 then illustrate exemplary process flows. In particular, FIG. 3 illustrates an exemplary process flow for configuring a browser. FIG. 4 illustrates an exemplary process flow for obtaining a digital certificate. FIGS. 5-7 are also provided to illustrate various aspects of the embodiments. For example, FIG. 5 shows an extract of Multipurpose Internet Mail Extensions (MIME) material including MIME headers when varying the filename. FIG. 6 shows samples of messages including taglines and digital signature data displayed using techniques of embodiments of the invention. And, FIG. 7 shows how a cascade of repositories may be chained together to build preference sets, which the extension uses in determining its behavior, such as the default behavior and UI selection for signing messages under composition. These figures will now be further described below.

FIG. 1 shows an exemplary system consistent with embodiments of the present invention. FIG. 1 is intended as an example, and not as an architectural limitation for the embodiments described. As shown, a system 100 may comprise a network 102, a user computer 104, a messaging server 106, and a CA server 108. These components will now be further described below. System 100 may include, however, additional servers, clients, and other devices not shown.

Network 102 serves as a communication infrastructure to support the communications between the other components of system 100, such as user 104, messaging server 106, and CA server 108. Such networks are well known to those skilled in the art including local area networks, metropolitan area networks, wide area networks, mobile communications networks (such as 3G networks), WiFi networks, and the like. In some embodiments, network 102 may comprise one or more networks of the Internet.

User computer (or simply "user") 104 provides the hardware and software for a user to utilize the methods and systems of the embodiments. The user computer 104 may be implemented on well known devices, such as, personal computers, network computers, mobile phones, laptops, and the like. In the depicted example, user computer 104 may comprise the hardware, software and data (not shown), such as processors, memory, storage systems, boot files, operating system images, and applications (like a browser and browser extension). Furthermore, the user computer 104 may employ the Transmission Control Protocol/Internet Protocol (TCP/IP) suite of protocols to communicate with the other components of system 100.

Messaging server 106 provides services, for example, to user 104 related to messaging. For example, messaging server 106 may be one or more web servers that implement a webmail application. Such servers are well known to those skilled in the art. Of course, messaging server 106 may provide other services, such as account management, or other forms of messaging. In some embodiments, messaging server 106 may relate to well known webmail services, such as Yahoo! Mail, Gmail, and the like.

In the depicted example, messaging server 106 may comprise the hardware, software and data (not shown), such as processors, memory, storage systems, boot files, operating system images, and applications (like a web server). Furthermore, the messaging server 106 may employ the TCP/IP suite of protocols to communicate with the other components of system 100.

CA server 108 serves as a middleman that trusted by both the user computer 104 and the messaging server 108. In general, the CA server 108 confirms that each computer is in fact who they say they are and then provides the public keys of each computer to the other. In some embodiments, the CA server 108 provides digital certificates and a PKI system that allows the user computer 104 and messaging server 106 to secure his or her messaging. For example, in some embodiments, the services of CA server 108 may enable the use of S/MIME by user 104 with a webmail application provided by messaging server 106.

In the depicted example, CA server 108 may comprise the hardware, software and data (not shown), such as processors, memory, storage systems, boot files, operating system images, and applications (like a web server). Furthermore, the CA server 108 may employ the TCP/IP suite of protocols to communicate with the other components of system 100.

FIG. 2 shows an exemplary browser and extension consistent with some embodiments of the present invention. As shown, the user computer 104 may be configured to execute a browser 200 and a browser extension 202. In addition, for various features of the embodiments, the browser 200 and extension 202 may access a repository 204. These components and certain aspects of his or her operation will now be further described.

Browser 200 serves as a user interface that is executed on the user computer 104. Such browsers are well known to those skilled in the art. Via the browser 200, the user 104 may thus access his or her messaging services, such as webmail. Of course, the embodiments may be implemented using other types of messaging client applications. For example, e-mail clients like Microsoft Outlook and Thunderbird may also be used in the embodiments.

Extension 202 assists the browser 200 in providing various features of the embodiments. In one embodiment of the present invention, a user installs, or causes to be installed, a piece of software onto said user's machine. The user may accomplish this, for example, by downloading extension 202 into the user's web browser 200. The extension 202 may be any software that modifies the browser's behavior. Examples of browser extensions that may be employed in the embodiments include, but are not limited to, "Browser Helper Objects" for Microsoft Internet Explorer and "Extensions" for Mozilla Firefox. Gmail S/MIME0.2.4, for example, is a type of browser extension that may be employed in the embodiments.

Repository 204 holds preference data, that when combined together form a preference set instance that governs how the extension 202 will behave. For example, a policy server (not shown) may mandate that all outgoing messages be signed, and the user's preference stored within the browser may indicate the same, but no repository may have an appropriate digital certificate and private key for a particular message under composition. The resulting behavior under this policy would be for the message to be sent unsigned, but a warning to be issued to the user before sending the unsigned message.

Embodiments of the invention may store preference in one or more preference repositories 204. Such preferences may include: the user's digital certificate(s) and private key(s); the user's preferences for display and encrypting of certain messages, such as automatically trying to sign or encrypt all messages by default; the digital certificates of recipients; and an accumulated history of interactions and preferences with respect to recipients or recipients' certificates.

Repository 204 may be located in various sites, such as, within the browser, within the operating system, on disk as an extension-specific data structure, a central policy server, or a globally-available server. The repository 204 may also be distributed across a peer-to-peer network, stored on a webmail server as special or encrypted data, stored at location on the Internet defined by the user, such as a website or an FTP site, or on or through a synchronizing network, such as Plaxo.

In addition, repository preferences may be cascaded. For example, the repository 204 may be cascaded according to the following example list: 1. default (stored internally in the extension) 2. global (via a global server) 3. per-messaging service type (e.g., per webmail service software vendor) 4. per sub-URI (e.g., per domain) 5. per URI (i.e., per particular webmail service) 6. per Sender (e.g., per identity or role indicated in a From: address) 7. per recipient type (e.g., per role) 8. per recipient (e.g., per identity) 9. per certificate 10. per e-mail address Repositories 204 subject to tampering, such as those that reside on a webmail server 106 or a globally public server, may be signed (by the user or by another trusted entity, such as the user's organization or by the authors of the extension) to ensure integrity, and may be encrypted to ensure confidentiality if the information in the repository 204 is considered private.

One advantage of signing the repository 204 by a storage provider, such as the webmail server 106, is that it might value the repository's 204 information (such as the list of recipient certificates) for various purposes including tracking digital certificate technology usage. A further advantage of signing is that the messaging server 106 already knows the recipient e-mail addresses by virtue of headers and other routing information in all e-mail messages.

In further embodiments, repositories 204 may synchronize with one another so that the user may access his or her repository information, such as address book information and corresponding certificates, from any messaging account, such as any webmail account. In the absence of using a central server, in one embodiment the extension sends periodic updates (such as per item in the repository changed, following logout, or every few minutes) to other known accounts in the form of (optionally signed or encrypted) e-mail messages. When the messages are received, they are optionally filtered via server rules to a special folder. When the user logs into the messaging service 106 while using the extension 202 on any installation, the extension 202 downloads and processes pending updates to the corresponding webmail repository 204, thus synchronizing each webmail repository 204 to a consistent state. The existence of said accounts may be recorded directly in a repository 204, so that the user 104 does not have to set up a list of such accounts in every browser-stored repository on the browsers 200 that the user uses.

In a further embodiment, the repository 204 is stored on a peer-to-peer network. In yet another embodiment, a primary repository is stored on a user-specified server, where each webmail service contains a repository with enough information to identify said user-specified server. Such an embodiment may be used to avoid the complexity of distributed updates while retaining at least two features. First, this embodiment retains the convenience of locating the user-specified server without requiring the user to constantly specify it on each local client. And second, the sense of security regarding the main repository on the user-specified server is retained, since the repository need not reside on a global server under control of the extension authors or another third-party.

FIG. 3 illustrates an exemplary process flow for obtaining a digital certificate consistent with some embodiments of the present invention. As noted above, embodiments of the invention may encourage installation of the extension 202 and the use of digital certificate technology more broadly, such as, via the following techniques. In one embodiment, the user is induced to obtain the extension 202 by prominently displaying informational messages or taglines.

Messages sent from the sender may be in one of three forms: plain, signed, or encrypted. Encrypted or signed parts may be encapsulated in signed or encrypted messages, forming a composite signed-and-encrypted message.

In some embodiments, whenever the user sends messages, the extension may 202 selectively inject taglines into the message prior to signing or encrypting the message. For example, such messages may be sent selectively only to those recipients whom the sender does not know have digital certificates, but who otherwise have the ability to process such messages if the extension is used. Taglines can invite the recipient to: verify the authenticity of the message or messages in general with the extension; question whether the message or other messages are authentic; secure messages between the sender or other senders in general with the extension; question whether the message or other messages are private; prompt the recipient to ask the sender more about the extension; and raise awareness of the extension.

Taglines may indicate to the user that the message may not be trusted, but merely suggest uncertainty. Such taglines may also show some connection to the sender, whom the recipient implicitly trusts. Of note, many standards, such as those applicable to S/MIME specifically discourage the use of taglines such as those described above. However, the taglines of the embodiments may nonetheless be useful despite this recommendation of the S/MIME standard.

These messages could be placed anywhere in the message. For example, taglines may appear at the top of a message. Taglines may also be employed for certain recipients based on criteria. For example, to promote the encryption features of the invention, taglines may indicate to the user that with the software, they can send and receive encrypted, sealed, or private messages, using verbiage that particular kinds of demographic groups of users would understand. Some recipients may respond negatively to taglines in messages that prompt a recipient to visit a heretofore unknown website, despite an existing trust relationship with the sender of the message. Rather than forwarding recipients to a heretofore unknown website, the recipient is prompted to ask the sender, with whom the recipient already has a trust relationship, more about the extension. Presumably by virtue of continued use of the extension, the sender is willing to discuss features of the extension to the benefit of expanded use of the extension.

Thus, the recipient can perceive that information regarding the extension is of higher value because it is provided from someone with whom the recipient has a pre-established level of trust.

With respect to the attached digital signature, opaque-signed message, or encrypted text, in some embodiments, S/MIME-incompatible mail agents, such as most webmail systems, display such elements as plain attachments. In some embodiments, the filename of the attachment may vary. Headers illustrating these embodiments are given in FIG. 5, and samples of such messages in mail agents are given in FIG. 6.

One advantage of the embodiments is that the filename may communicate more informative information about the attachment than its association with S/MIME. In one embodiment, the attachment bears a description and an origin, such as "Extension-type Digital Signature." Such a filename convention may prove useful for branding the origin or source of the cryptographic material. In another embodiment, the attachment bears a tagline or hortative message like, "Use Extension Everyday." A myriad of other embodiments are possible. For example, one exemplary embodiment varies the filename base, but retains the corresponding file extension. Thus, if a user attempts to download or open the attachment, the attachment would behave in the normal course of opening files with similar file extensions.

Referring now to the process illustrated in FIG. 4, in one embodiment of the present invention, a user installs, or causes to be installed, a piece of software onto said user's machine. The user may accomplish this, for example, by downloading the extension 202 into the user's web browser 200. The extension 202 may be any software that modifies the browser's behavior. As noted, examples of browser extensions that may be employed in the embodiments include, but are not limited to, "Browser Helper Objects" for Microsoft Internet Explorer and "Extensions" for Mozilla Firefox.

In general, when a user navigates to a webpage on messaging server 106, the messaging server 106 may determine the environment on user computer 104. For example, the messaging server 106 may detect the browser 200, operating system on the user computer 104, and other parameters of the user's computer 104 client using HTTP headers, the client's IP address, and other methods.

Next, the messaging server 106 then serves a webpage prompting the user to download the extension automatically, for example, using ActiveX technology in Internet Explorer, Installed Trigger XPI files in Mozilla Firefox, and the like. In some embodiments, the user may be prompted to accept the extension 202.

FIG. 4 illustrates an exemplary process flow for obtaining a digital certificate and using S/MIME with his or her messaging service in accordance with some embodiments of the present invention. From the user's perspective, the process may appear very simple and require little or no interaction. In particular, the user's experience of the process would generally comprise: logging in to his or her messaging service 106, such as webmail (however, the logging in process may be bypassed, for example, with the use of cookies); view a dialog about certificates and identity management; optionally click to accept (or wait for automatic countdown); and then use webmail of the messaging service 106 in his or her customary fashion. Even if the user needs to install an extension 202 or other software, the user's experience of the process will require little or no interaction and may generally comprise: installing the extension 202 or other software and optionally clicking to accept installation; if the browser 200 was restarted, logging in to webmail of the messaging server 106 (however, the logging in process may bypassed, for example, with the use of cookies); view a dialog about certificates and identity management; wait for automatic countdown or optionally edit entries and click to accept; and use webmail of the messaging server 106 in his or her customary fashion. Therefore, in both such circumstances, the user may obtain and begin using a trusted CA-issued digital certificate in one click or less.

Although the embodiments may be generally configured to require little or no interaction with the user in order to simplify the user's experience, the user may be prompted at various times as desired by the messaging service, CA, etc. Requiring at least one click or other positive user acknowledgement following the presentation of options, may be employed for one or more reasons. For example, when a private key is stored on the webmail server 106 or any third-party accessible location, the user may be precluded from arguing that the key has been lost. Nevertheless, the user may be provided the option of storing the key in and retrieving the key from a non-third-party server location. Thus, for some embodiments, the advantages of presenting alternative options during private key creation and retrieval, requiring some positive user interaction may be employed.

In another embodiment, this process repeats not just after first installation of the extension 202, but at any time after a user logs in to a messaging service and when the extension 202 fails to detect a corresponding appropriate digital certificate via its assorted preference repositories 204.

The underlying steps and actions of one embodiment for obtaining and using a digital certificate will be now further described below. After the extension has been installed, the user logs into the messaging server 106, was logged in, or is logged automatically into the messaging server 106, such as his or her webmail service, in his or her customary fashion. Alternatively, where the user is employing an e-mail client (such as Outlook), the user may access the messaging server 106 automatically as the e-mail client is started on the user computer 104.

Next, without any further action, or with only a small amount of user interaction (such as a single click for confirmation purposes), the browser extension obtains a digital certificate signed by a certificate authority so that the user and may start sending signed messages through his or her webmail service. In some embodiments, a nominal amount of user interaction may be included as part of this phase. The user's acceptance may be indicated by various means, may be implied through other actions of the user, or maybe implied by the passive acceptance of certain automated processes used by some embodiments.

In phase 402, the extension checks for the presence of existing certificate and private key combinations secured for the user. In the embodiments, a user is provided one or more preference repositories. These repositories are further discussed below, but by way of example, might include a) the local certificate storage of the browser, and b) the webmail service itself In the case of b), the extension searches the server for such data in a predetermined place, such as the message store (as a specially-named message), or as data attached to an address book entry. Such data can be encrypted by using another private key in order to prevent administrators or attackers who get access to the webmail system to use the user's private key to decrypt messages and impersonate the user.

The use of repositories by the embodiments can have several benefits. With the use of repositories by some embodiments, the private key can be securely stored on the webmail server so that the user can retrieve the key from any web browser equipped with the extension. Yet another advantage of the repositories 204 is that the user will dramatically decrease the risk of losing the key due to faulty or lost media, such as a hard disk crash, a natural disaster, or simply dropping a floppy disk or a flash memory stick.

Furthermore, if the extension stores the key using stenographic techniques on the messaging server, the repositories may be hidden amongst other e-mail patterns, such as in the body or MIME preambles of selected messages. For ease of use, the user's password (or passphrases) could be keyed to identify such messages or sub-portions of messages. Users may be trained to avoid reusing his or her login passwords for his or her cryptographic passwords, and the extension could check since the extension can observe users' passwords at initial login. Indeed, in one embodiment, the extension 202 can encourage a user to pick a deliberately long, complicated, and obtuse recovery passphrase, and then to write it down and store it in a private place. Such a strategy can provide for automatic two-factor authentication, since to recover the key the user needs to produce his or her login password (which he or she "knows") and his or her passphrase.

In one embodiment, when the user obtains his or her private key and wishes to upload it to repository 204, the extension 202 may generate a recovery key, such as a 128-bit symmetric key. The extension 202 may then provide the recovery key to the user, which the user may store in a secure place, such as on a disk or even in written form. In certain instances, the user may then utilize this recovery key to reinitialize or recover his or her private key. The recover key may be used to encrypt a recovery block that includes a challenge question. The user may then use the recovery key to access his or her account on messaging server 106 to recover his or her private key based on decrypting recovery block and the challenge question. The answer to the challenge questions may used to recover his or her private key.

The user may be discouraged or prevented from utilizing easy challenge questions, such as "where did you grow up," or "what high school did you attend." Indeed, system 100 may monitor various websites and databases that indicate which challenge questions are likely insecure.

In phase 404, if an appropriate digital certificate is not found or is not selected, the extension extracts other information, such as, personal information like the user's e-mail address(es) and other information to be included in the digital certificate, such as the user's name-from the messaging service. The extension may extract this information via page scraping techniques or by sending a predetermined type of request to the messaging server to retrieve the data from the user's stored preferences on the server. Alternatively, in phase 406, if a digital certificate is found but not selected, the extension may optionally extract information from the digital certificate rather than or in addition to information found on the messaging service.

Optionally, the extension may provide an interface element, such as a popup window or a form, to setup the extension with information and input controls for the user to view. Input controls may be pre-populated with the personal information obtained previously, such that the user may modify the information. Optionally, the interface may prevent the user from modifying the e-mail address associated with the login to the service, or may permit multiple e-mails to be associated with one certificate (within the constraints of the CA's policy).

In addition, the interface may present information to teach the user about digital certificate technology. The user interface may present information to the user to import or otherwise reuse an existing certificate and private key in lieu of generating a new one. The user interface may present virtually all of these options as advanced options. These advanced options may be accessed, for example, via an additional click or confirmation to reveal such options.

During operation, the user accepts that the extension will request, associate, or reuse a digital certificate and private key on the user's behalf This acceptance may be indicated in various ways. If the user chooses to reuse an existing certificate and private key, the extension stores that association in its preferences and will permit the user to use webmail per the usual course. Otherwise, the extension causes a public-private key pair to be generated, or obtains the public-private key pair from another source. Such a source might include a smartcard, a file on disk, or another certificate, such as an expired, yet uncompromised certificate and private key.

In phase 408, the extension may bundle the public key and other information into a certificate request to the CA's server. Various certificate request implementations are known in the art, one of which is known as a certificate signing request. This request may be accomplished by performing the automated equivalent of submitting an online form, or by calling special remote application programming interfaces. In one embodiment, this request may be accomplished by performing the automated equivalent of submitting an online form, or by calling special remote application programming interfaces along a channel of communication.

In phase 410, the CA's server, upon receiving the request, optionally gathers and logs additional information about the request, such as the originating IP address and the apparent client (browser and extension) that made the request. The CA server may then send a reply using various channels of communications, such as an e-mail, text message, instant message, telephone message, fax, etc.

The extension receives the reply and determines if the CA request was accepted based on the verification reply from the CA server. As noted, this reply may be expected via one or more channels of communication, such as an e-mail, text message, phone call or communication, fax, and the like. In particular, the embodiments may rely upon security and authentication guarantees that multiple channels provide. For example, an e-mail address verification verifies one's e-mail address (assuming that the e-mail system is not compromised); credit card verification verifies information associated with the credit card, such as name and billing address (assuming that the credit card system is not compromised). In some embodiments, the system provides verification of multiple pieces of information through multiple channels with little or no user interactions.

In one embodiment, the system verifies multiple e-mail addresses associated with a particular login. A common practice, for example, is for a user to have multiple e-mail addresses (user@example.com, user@webmail.com, user@school.edu) and to forward all messages to a designated webmail account. In an exemplary embodiment, the user enrolls each address separately, for example, by: a) automatic prompting when the extension detects a new From address the user is using, by analyzing the webmail interface, or b) manually through user indication, such as clicking a button in an interface.

In some instances, the user may employ multiple certificates, e.g., one per address, but if desired, the user also may be able to reuse a previously-used private key. In the embodiment at issue, the user can indicate that multiple e-mail addresses are to be present in the certificate. Proceeding down the steps, the extension thus repeats its processing for every e-mail address and every received message, until all e-mail addresses are verified. Then the certificate authority issues the digital certificate per the aforementioned process.

Alternatively, the user may maintain multiple e-mail addresses that do not automatically forward to one account. In such a case: the extension may monitor multiple accounts provided that the user is logged into those accounts or that the extension obtains the user's login credentials. As another alternative, the extension may provide a user interface for entering verification codes, which the user may enter at any time. This alternative embodiment provides for cases in which the extension has no programmable control over certain verification channels, such as by postal mail or telephone call.

The foregoing multichannel embodiments may submit such verification codes to the CA in serial fashion as they are received and thereby may present to the user indicia, such as a checkmark next code codes, indicating that the CA accepted the code, or may batch all or selected subsets of verification codes to the CA in as few as one step.

In the case of an immediate response, such as by e-mail or instant message, the extension may present an optional user interface indicating that the request is being processed and should arrive shortly. For longer responses, such as a delayed e-mail, instant message, or postal mail, the extension may notify the user the process will be completed upon receipt of further instructions or information.

In some embodiments, the browser extension is configured to detect the reply, such as an e-mail. That is, the browser extension may monitor received e-mails to the user until the desired verification message arrives and may then act upon the message automatically with or without user interaction. Upon receiving a verification message, which is optionally signed to prevent a timing-based spoofing attack, the extension follows an embedded link or other embedded information (e.g., verification codes) to a pickup location, such as a URL, on the CA's server.

In another embodiment, the CA server may include the CA-signed digital certificate inside its reply in the form of a verification message. In this embodiment, techniques known in the art, such as linking to a CA verification site via SSL (HTTPS), may be used. The browser and extension may submit a nonce, such as one formed based on the URL or other embedded information to the authenticated CA server. This technique may be useful, for example, to avoid staleness and man-in-the-middle vulnerabilities.

The CA may include any information in the certificate that the CA wishes to assert, consistent with the CA's policies. For example, the e-mail address verification may bind the request, for example, over HTTP to an e-mail address. IP addresses recorded during the request sequence and the post-verification pickup sequence may be entered into the attributes including DN, signed attributes, or other structures of the digital certificate. Although the IP address may not uniquely identify the user, recording IP addresses may make it easier to track down malicious users of said certificates. Furthermore, storing IP addresses in the issued certificates may serve a public notice function. Such public inclusion would further discourage malicious users from sending, for example, spam because his or her acquisition of certificates could be traced to particular IP addresses at particular times and from that IP address in particular.

In phase 412, upon picking up the digital certificate, the extension causes the digital certificate and private key to be united and can then be used by the user in his or her messaging. Optionally, the extension can present an indication to the user that the operation completed successfully, that the user may start using digital certificate technology, and that the user may indicate that he or she would like to learn more about such technology.

Different messaging recipients may use messaging agents with widely varying capabilities. For example, some messaging clients may not support appropriate transmission or presentation of signed or encrypted messages. Various embodiments of the invention may thus collect, record, and act upon properties of messages observed over time during communication between parties.

In an embodiment, repositories interact to define preference sets as elaborated above. Preference sets define, per category of recipient information identified in the list proceeding paragraph, the following inclusive features on a per-message basis (or alternatively or in addition, per-date and time basis): e-mail addresses; certificates; whether and to what extent the recipient likes to receive tag lines or signed-only messages, based on observed responses; e-mail clients that the recipient uses; intermediate gateways and mail filters; other e-mail headers; other e-mail routing information; the expressed preferences of recipients (i.e., those from whom the user is receiving messages and to whom the user will send messages); and explicit behavioral preferences independent of or as a consequence of observed features.

For each message that is received, the extension may record some information given above into an appropriate repository. These records may be batched and transmitted to remote repositories over time, to minimize bandwidth consumption-thus, repositories or parts of repositories may be cached. The appropriateness of a given repository is also a function of the preference set, but in a preferred embodiment, certain repositories would be read-only, such as those on central policy servers or the system default repository.

For purposes of efficiency, an embodiment may summarize the observed features into pre-computed preferences. Such pre-computation may save access bandwidth and processing time. For example, after observing one month of e-mail, the extension may compute "for the recipient r@x.com, always send signed e-mails," because 95% of the observed e-mails demonstrate the use of a compatible e-mail client. Thereafter, with the use of this preference, the extension need not continually integrate the previous month's results for that user.

In an embodiment, the extension may automatically or at the direction of the user submit the aggregated results of certain classes of recipients, such as, the results of whether a whole domain's recipients' mail clients can interpret signed messages to the extension authors for integration into global or otherwise widely-available repositories. In another embodiment, on first installation, activation, or upon detecting that certain repository information is unavailable or uninitialized, the extension may index messages to record the evolving capabilities of recipients' mail clients over time.

When composing a message, the extension may rely upon the preference set in determining whether by default to sign (either clear-sign or opaque-sign), or encrypt the given message for a given set of recipients. The extension may optionally permit the user to modify those preferences for the message under composition. Preferences are not limited to whether a message is signed or encrypted. For example, preferences might additionally include the following features:

whether to store a plaintext, index-able copy of the message on the messaging server for the user to read;

whether to produce a single encrypted body for delivery to all recipients including the ability for any recipient to decrypt the data sent to any other recipient;

whether to produce multiple encrypted bodies, where each recipient receives data that only the recipient can decrypt; whether the encrypted body or bodies can also be decrypted by the sender, and if so, by which private keys of the sender;

whether to encrypt for additional entities, such as for a recovery or compliance entity in the event of litigation or other need; with which algorithms to sign and encrypt;

whether the recipients support particular MIME encodings such as 8 bit or binary; and which secure messaging standards (such as S/MIME v3) to use.

A sample of how repositories interact to define preference sets and default UI selections is illustrated in FIG. 7. Referring now to FIG. 7, the effective preference set is used to compute rather than dictate the default UI selection. For Computer 2, none of the e-mails to the listed recipients are ever signed by default because there is no private key with which to sign, despite the fact that the preference set suggests that some e-mails should be signed.

It is intended that the specification and examples be considered as exemplary only. For example, many other variations are possible. The browser and the extension may be combined into one functional piece of software. The extension may be given appropriate permissions and trust and may be embodied by JavaScript, plug-ins, binary controls, or other elements residing in a page's security context. In addition, embodiments of the present invention may be applicable to applications other than a browser, such as an e-mail client, a messaging client, an application on a mobile phone, or the like. The true scope and spirit of the invention are indicated by the following claims.

What is claimed is:

1. A method of securing communications, said method comprising:
   accessing a messaging service;
   extracting, using at least one computer processor, identification information that identifies a user of the service;
   receiving a single user interface input from the user;
   obtaining a key pair comprising a public key and a private key, and submitting a request for a certificate to a certificate authority (CA) based on the key pair, wherein the key pair is obtained and the request for the certificate is submitted in response to the single user interface input without requiring further user interface inputs from the user;
   receiving a verification code from the CA;
   confirming, using the at least one processor, receipt of the verification code from said CA;
   generating, using the at least one processor, a certificate for the user based on the verification code and the key pair; and
   securing communications from the user based on the generated certificate.

2. The method of claim 1, further comprising detecting a preexisting certificate and a preexisting private key, wherein the preexisting certificate and the preexisting private key are detected in response to the single user interface input without requiring further user interface inputs from the user.

3. The method of claim 1, wherein receiving the verification code is received from the CA is conducted subsequent to receiving the single user interface input from the user.

4. The method of claim 1, wherein confirming receipt of the verification code comprises automatically following a link to a website designated by the CA.

5. The method of claim 1, wherein the certificate for the user is generated subsequent to receiving the single user interface input from the user.

6. The method of claim 1, wherein confirming receipt of the verification code from said CA comprises monitoring messages received having information related to the request for the certificate.

7. The method of claim 1, further comprising presenting an interface to a user for an opportunity to confirm the verification code.

8. An apparatus configured to provide secured communications, the apparatus comprising:
   at least one computer processor; and
   a computer readable storage medium comprising executable instructions configured to cause the at least one computer processor to perform operations comprising:
      accessing a messaging service;
      extracting, using at least one computer processor, identification information that identifies a user of the service;
      receiving a single user interface input from the user;
      obtaining a key pair comprising a public key and a private key, and submitting a request for a certificate to a certificate authority (CA) based on the key pair, wherein the key pair is obtained and the request for the certificate is submitted in response to the single user interface input without requiring further user interface inputs from the user;
      receiving a verification code from the CA;
      confirming, using the at least one processor, receipt of the verification code from said CA;
      generating, using the at least one processor, a certificate for the user based on the verification code and the key pair; and
      securing communications from the user based on the generated certificate.

9. A non-transitory computer readable medium comprising executable program instructions that, when executed on one or more computer processors, cause the one or more computer processors to perform operations comprising:
   accessing a messaging service;
   extracting identification information that identifies a user of the service;
   receiving a single user interface input from the user;
   obtaining a key pair comprising a public key and a private key, and submitting a request for a certificate to a certificate authority (CA) based on the key pair, wherein the key pair is obtained and the request for the certificate is submitted in response to the single user interface input without requiring further user interface inputs from the user;
   receiving a verification code from the CA;
   confirming receipt of the verification code from said CA;
   generating a certificate for the user based on the verification code and the key pair; and
   securing communications from the user based on the generated certificate.

* * * * *